United States Patent
Grossman et al.

(10) Patent No.: US 11,754,181 B2
(45) Date of Patent: Sep. 12, 2023

(54) OVERMOLDED DIAPHRAGM FOR USE IN A PUMP

(71) Applicant: Graco Minnesota Inc., Minneapolis, MN (US)

(72) Inventors: Nathan C. Grossman, Maple Grove, MN (US); Tera D. Brezny, Lino Lakes, MN (US); Ronald A. Flor, Anoka, MN (US); Todd L. Johnson, Minneapolis, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 18/094,013

(22) Filed: Jan. 6, 2023

(65) Prior Publication Data

US 2023/0243424 A1 Aug. 3, 2023

Related U.S. Application Data

(60) Provisional application No. 63/304,450, filed on Jan. 28, 2022.

(51) Int. Cl.
  *F16J 3/02* (2006.01)
  *F04B 43/06* (2006.01)
  *F04B 43/00* (2006.01)

(52) U.S. Cl.
  CPC ............. *F16J 3/02* (2013.01); *F04B 43/0054* (2013.01); *F04B 43/06* (2013.01)

(58) Field of Classification Search
  CPC ...... F16J 3/02; F04B 43/0054; F04B 43/0063
  See application file for complete search history.

(56) References Cited

U.S. PATENT DOCUMENTS

| | | | |
|---|---|---|---|
| 5,634,391 A * | 6/1997 | Eady | F16J 3/02 92/99 |
| 5,687,633 A * | 11/1997 | Eady | F16J 3/02 92/99 |
| 6,435,844 B1 | 8/2002 | Fukami | |
| 6,496,451 B2 | 12/2002 | Kimura et al. | |
| 6,877,419 B2 * | 4/2005 | Ohrle | F04B 43/0054 92/98 R |
| 6,883,417 B2 | 4/2005 | Headley et al. | |
| 6,923,108 B2 * | 8/2005 | Ohrle | F04B 43/0054 92/103 F |
| 7,399,168 B1 | 7/2008 | Eberwein | |
| 7,905,172 B2 * | 3/2011 | Ohrle | F04B 43/0054 417/474 |
| 10,422,331 B2 | 9/2019 | Ezzo et al. | |
| 11,415,122 B2 * | 8/2022 | Freissler | F04B 43/02 |
| 11,585,336 B2 * | 2/2023 | Oehrle | F04B 43/0054 |

* cited by examiner

Primary Examiner — Michael Leslie
(74) Attorney, Agent, or Firm — Kinney & Lange, P.A.

(57) ABSTRACT

A diaphragm for use in a pump includes a cover configured to contact fluid to pump the fluid and a backing disposed at least partially within the cover. The backing includes a flexible plate that extends outward relative to a core of the backing, the flexible plate configured to flex during reciprocation of the diaphragm. The cover is formed from a first polymer and the flexible plate is formed from a second polymer.

20 Claims, 8 Drawing Sheets

OVERMOLDED DIAPHRAGM FOR USE IN A PUMP

CROSS-REFERENCE TO RELATED APPLICATION(S)

This application claims the benefit of U.S. Provisional Application No. 63/304,450 filed Jan. 28, 2022, and entitled "OVERMOLDED DIAPHRAGM FOR USE IN A PUMP," the disclosure of which is hereby incorporated by reference in its entirety.

BACKGROUND

This disclosure relates generally to diaphragm pumps. More particularly, this disclosure relates to overmolded diaphragms for use in diaphragm pumps.

Diaphragm pumps utilize a diaphragm to pump and/or pressurize fluids. Such fluids can include liquids and/or gases. Such fluids can include water, chemicals, adhesives, coatings, waste, vapor, and food product, amongst other options. Some applications of diaphragms require sanitary operation, particularly by fluid-contacting parts of the pump. Certain types of materials may contact the fluid being pumped while other types of materials are isolated from the fluid. The present disclosure concerns overmolding the diaphragm so that some structural parts of the diaphragm do not contact the fluid being pumped, while making the diaphragm robust for its intended use.

SUMMARY

According to one aspect of the disclosure, a diaphragm for use in a pump and configured to reciprocate on an axis, the pump having a connecting rod. The diaphragm includes a cover having a bead and a flexing portion radially inward from the bead, the cover formed from a first polymer and configured to contact fluid to pump the fluid; and a backing disposed at least partially within the cover, the backing comprising a hub for connecting to the connecting rod, the backing further comprising a flexible plate, the flexible plate formed from a second polymer. The first polymer of the cover is thermally bonded to the second polymer of the flexible plate.

DETAILED DESCRIPTION

Diaphragms for pumps are reciprocated through respective pumping and suction strokes to respectively decrease and increase the volume of a pumping chamber to pump fluids through the pumping chamber. Diaphragms according to the disclosure include a backing that is overmolded by a flexible cover. The flexible cover is configured to contact the pumped fluid. The backing includes a plate that extends radially outward from a hub. The hub is configured to connect to a driver of a pump, such as a connecting rod. The backing is formed as a flexible component that can flex with the flexible cover during pumping.

Figure 1:
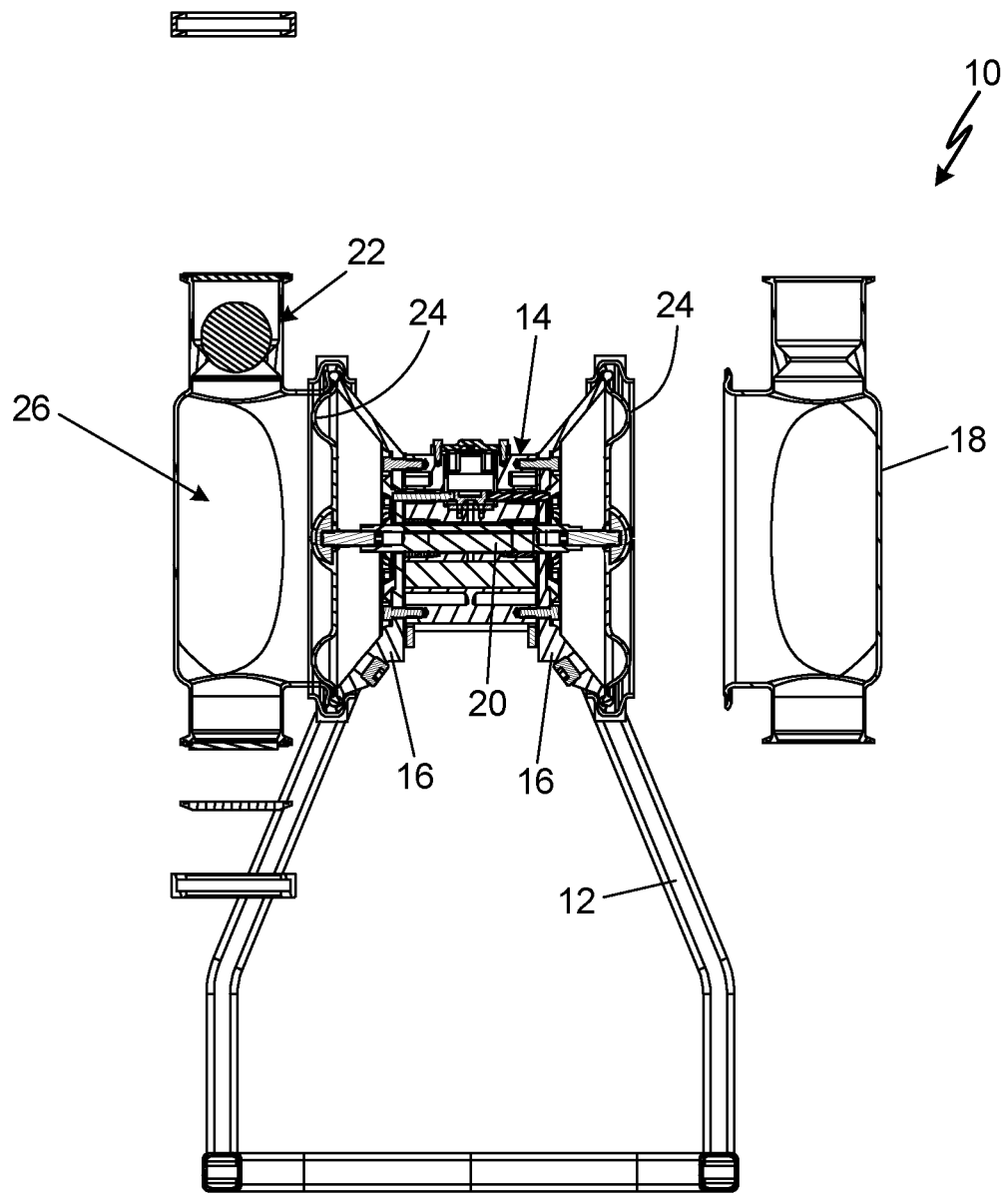
FIG. 1 is a cross-sectional, partially exploded view of a diaphragm pump.

FIG. 1 is a cross-sectional, partially exploded view of pump 10. Pump 10 includes frame 12, drive 14, end plates 16, fluid covers 18, connecting rod 20, check valves 22 (only one of which is shown), and diaphragms 24.

As shown, pump 10 is in a partial state of disassembly, and does not include all components. It will be understood that diaphragms 24 according to the present disclosure can be used in a variety of types of pumps, beyond that shown. A double diaphragm pump will be used herein as an example, although diaphragms 24 according to the present disclosure can be used in single diaphragm pumps or diaphragm pumps requiring more than two diaphragms. In a double diaphragm pump, in which the diaphragms 24 may be directly or indirectly mechanically linked to flex and pump out of phase, one diaphragm 24 will be in the pumping stroke while the other is in a suction stroke.

Frame 12 is configured to support other components of pump 10 relative to a support surface, such as the ground or another supporting surface. Frame 12 can be connected to drive 14 or other components of pump 10. Drive 14 is configured to power reciprocation of diaphragms 24 along pump axis PA. Drive 14 can be of any desired configuration suitable for displacing diaphragms 24. For example, drive 14 can be configured to pneumatically, hydraulically, and/or mechanically move a diaphragm 24. In some examples, drive 14 can include an electric motor that mechanically drives displacement of the one or more diaphragms 24.

End plates 16 are mounted to drive 14. For example, end plates 16 can mount to a main housing portion of drive 14. End plates 16 form housing components of the drive 14. In the example shown, end plates 16 are mounted at each axial end of drive 14 as pump 10 is a double diaphragm pump. Fluid covers 18 are configured to at each axial end of drive 14. Diaphragms 24 can be pinched between a fluid cover 18 and the drive 14, specifically between the fluid cover 18 and the end plate 16 in the example shown. An outer radial edge of the diaphragm 24 can be pinched between the other components to seal a pumping chamber 26. The pumping chamber 26 is formed within each fluid cover 18 and is at least partially defined by a diaphragm 24. The driven fluid is pumped through the pumping chamber 26 by a reciprocation of a respective diaphragm 24 of that pumping chamber 26. Diaphragm 24 can partially define a pumping chamber 26 and can, in some examples, directly contact the fluid being pumped through the pumping chamber 26.

Connecting rod 20 is connected to the diaphragm 24 and is configured to displace the diaphragm 24 in one or both axial directions along the pump axis PA to cause pumping by the diaphragm 24. The connecting rod 20 is displaced along the pump axis PA by the drive 14. The connecting rod 20 may drive the diaphragms 24 through one or both of the pumping and suction strokes, and/or may actuate a valve that controls pressure on the inner side of the diaphragm 24 that moves the diaphragm 24 through one or both of the pumping and suction strokes.

Reciprocation of the center of the diaphragm 24 increases and decreases the volume in the pumping chamber 26, pulling fluid into the pumping chamber 26 during the suction stroke, as the volume of pumping chamber 26 increases, and pushing the fluid out of the pumping chamber 26 during the pumping stroke, as the volume of pumping chamber 26 decreases. The flow into and out of the pumping chamber 26 is gated by a pair of check valves 22 for each pumping chamber 26. The diaphragm 24 reciprocates to move the fluid from an upstream direction to a downstream direction. The example shown includes an outlet check valve 22 for one of the pumping chambers 26, but it is understood that each pumping chamber 26 can be operatively associated with an upstream, inlet check valve 22, and a downstream, outlet check valve 22. For example, a double diaphragm pump 10 can include four check valves 22, two inlet check valves 22 and two outlet check valves 22.

Figure 2A:
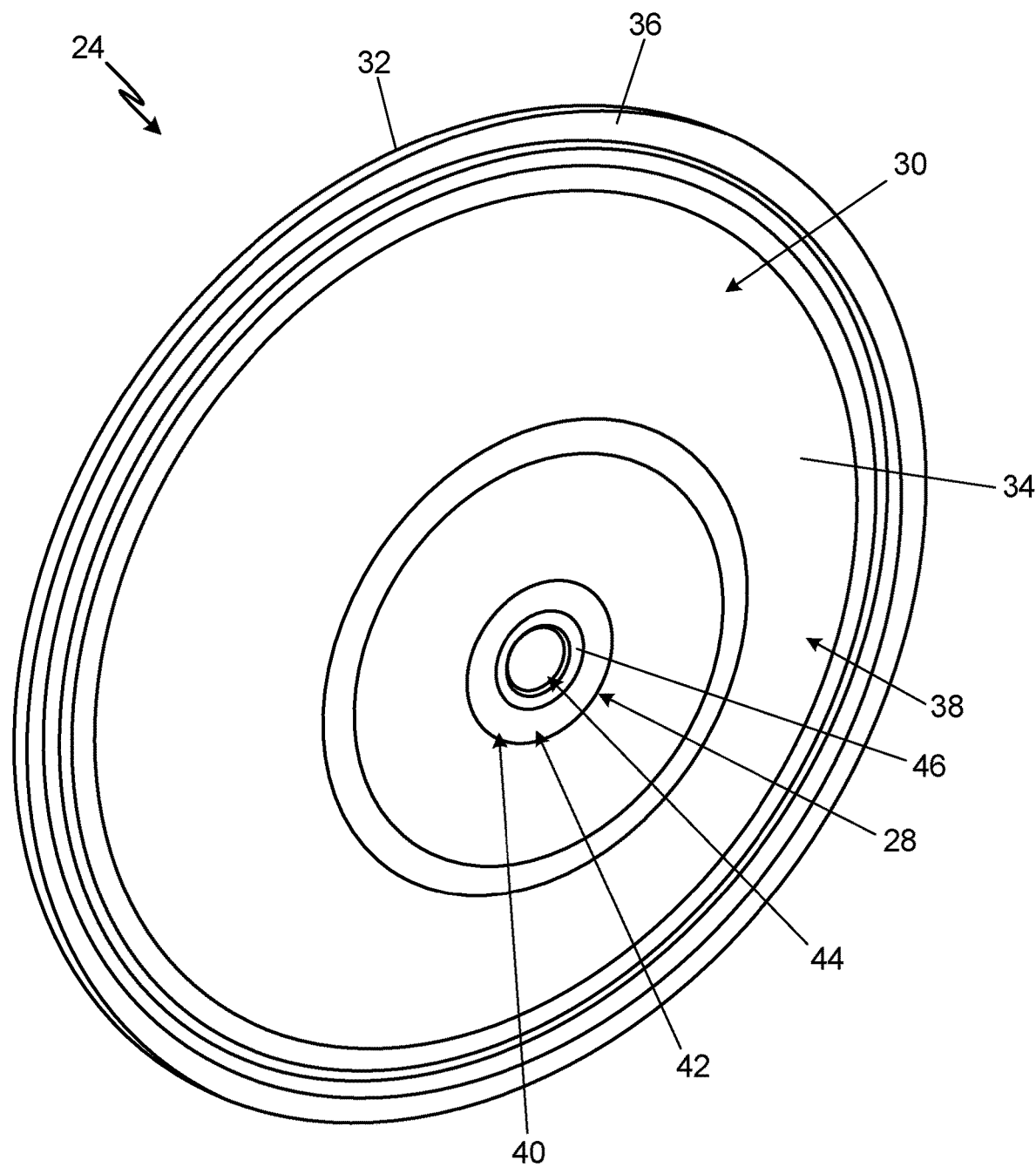
FIG. 2A is an isometric view of a diaphragm.
Figure 2B:
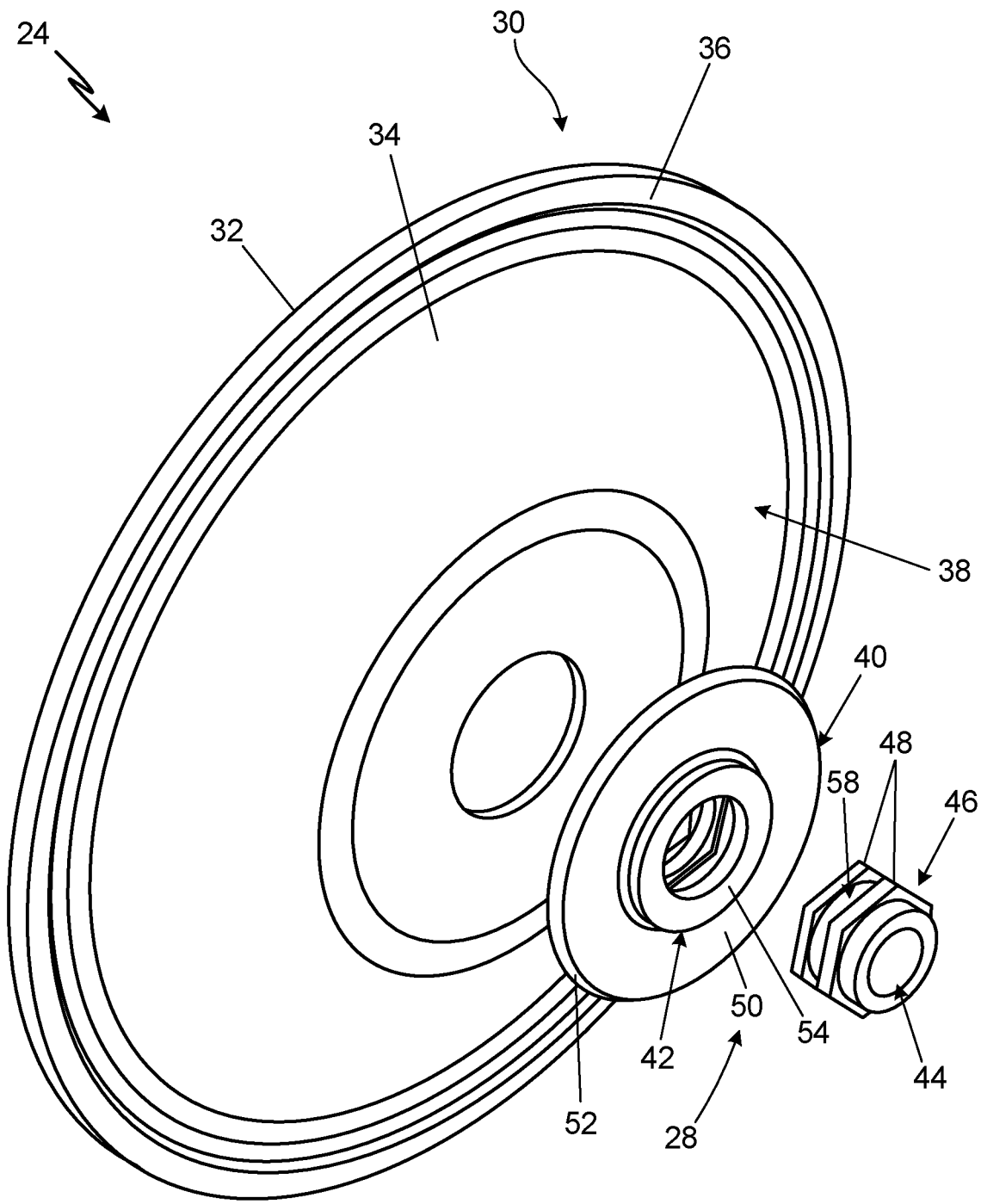
FIG. 2B is a cross-sectional view of the diaphragm shown in FIG. 2A taken along line B-B in FIG. 2A.
Figure 2C:
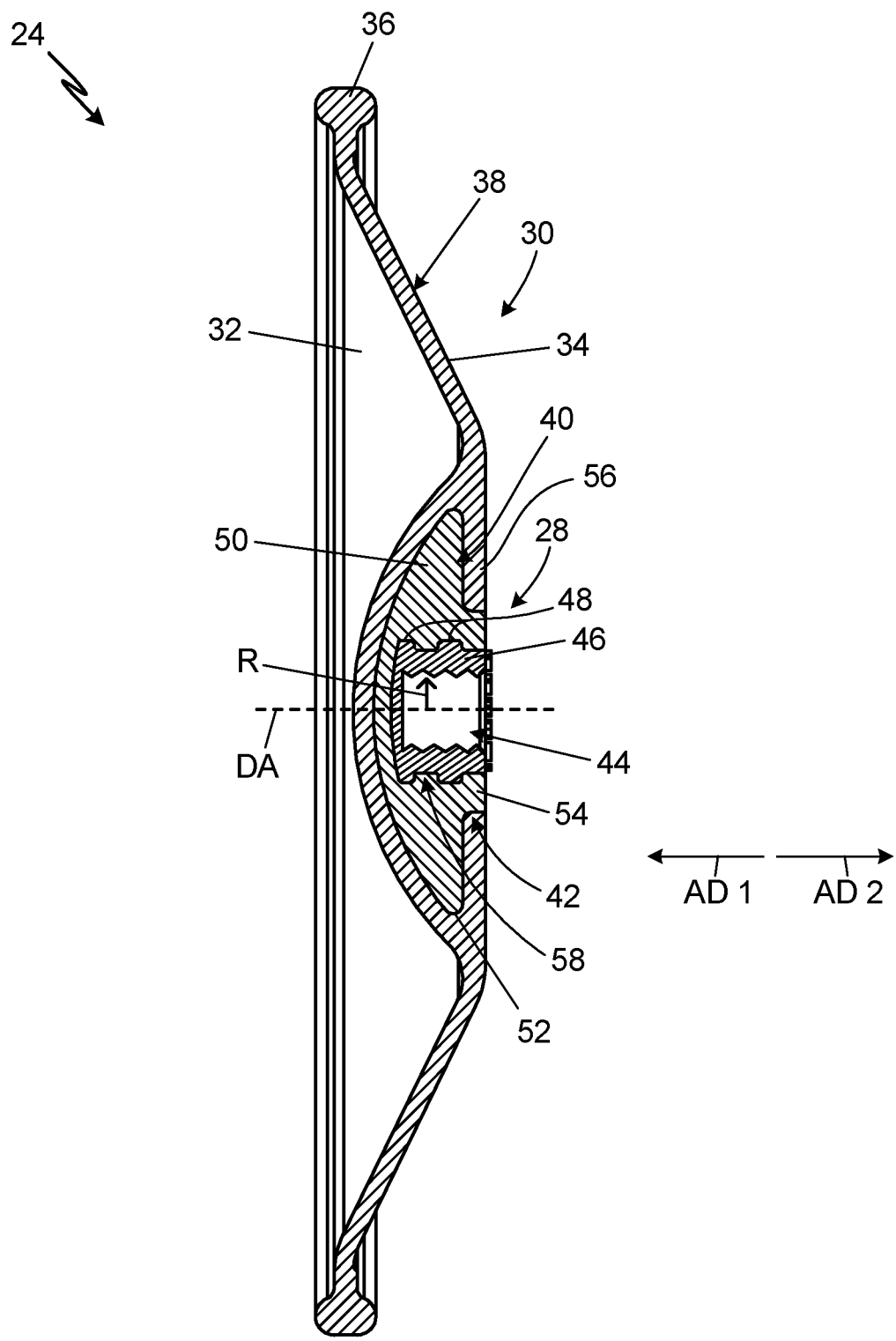
FIG. 2C is an exploded view of the diaphragm.
Figure 3:
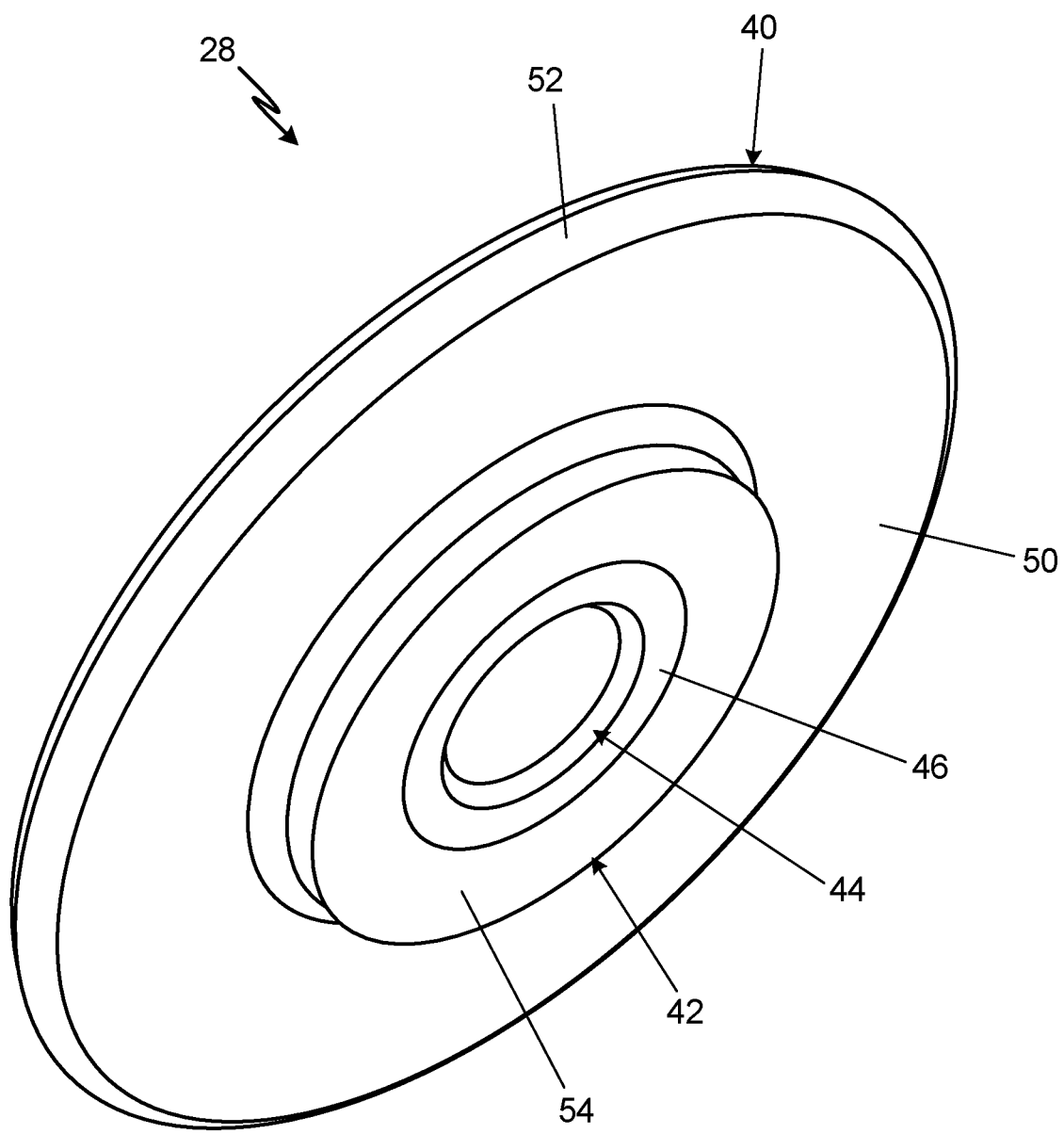
FIG. 3 is an isometric view of a backing for a diaphragm.

FIG. 2A is an isometric view of diaphragm 24. FIG. 2B is an exploded view of diaphragm 24. FIG. 2C is a cross-sectional view of diaphragm 24. FIG. 3 is an isometric view of backing 28. FIGS. 2A-3 will be discussed together. Diaphragm 24 includes backing 28, cover 30, outer side 32, and inner side 34. Cover 30 includes bead 36 and flexing portion 38. Backing 28 includes flexible plate 40, core 42, and hub 44.

The diaphragm 24 includes outer side 32 (facing away in FIG. 2A) and inner side 34 (the broad side shown in FIG. 2A). Diaphragm 24 is relatively dish-like such that the outer side 32 is opposite inner side 34 and the outer side 32 and inner side 34 do not face each other. Outer side 32 is configured to displace the pumped fluid. Outer side 32 can contact the pumped fluid to pump the fluid while inner side 34 is configured to be oriented towards the interior of the pump, such as pump 10 (FIG. 1). In some examples, such as pneumatically or hydraulically powered pumps, inner side 34 can be contacted by the driving fluid (e.g., compressed gas or hydraulic oil) to cause displacement of diaphragm 24, though it is understood that not all examples are so limited. Inner side 34 and outer side 32 are disposed on opposite axial sides of diaphragm 24 relative to diaphragm axis DA. Diaphragm axis DA extends through a center of diaphragm 24. Diaphragm 24 is configured to reciprocate on diaphragm axis DA during pumping. Diaphragm axis DA can be disposed coaxially with the pump axis PA of a pump.

Bead 36 is formed as an outer periphery of the diaphragm 24. Bead 36 can be formed as a thick rim that is configured to be pinched between components of the pump (e.g., between end plate 16 and fluid cover 18) for sealing with the pump 10. Bead 36 can be formed as a portion of diaphragm 24 having a greater axial thickness than the flexing portion 38 disposed radially inward of bead 36. Bead can be formed as the radially outermost portion of diaphragm 24.

Flexing portion 38 extends radially inward from bead 36. Flexing portion 38 is configured to flex during pumping cycles of the diaphragm 24. During a pumping cycle, the center of diaphragm 24 is configured to shift in first axial direction AD1 along diaphragm axis DA as the diaphragm 24 moves through a pump stroke and the center of diaphragm 24 is configured to shift in second axial direction AD2 along diaphragm axis DA as the diaphragm 24 moves through a suction stroke. The center of diaphragm 24 moves along the diaphragm axis DA and relative to the bead 36 that is held stationary. Flexing portion 38 flexes between the stationary bead 36 and the reciprocating center of diaphragm 24.

The exterior of the diaphragm 24 is generally formed from a fluid contacting cover 30. The fluid contacting cover 30 is formed from a flexible polymer material such as a thermoplastic vulcanite (TPV). For example, cover 30 can be formed from Santoprene® thermoplastic vulcanizate (available from Celanese) or other dynamically vulcanized alloy consisting mostly of fully cured EPDM rubber particles encapsulated in a polypropylene matrix. It is understood that other types of polymer for forming the cover 30 are possible. The entirety of outer side 32 of diaphragm 24 may be formed from the first polymer that forms the cover 30, such that no other parts of the diaphragm 24 than cover 30 may contact the pumped fluid. The first polymer that forms the cover 30 is ideal for its flexibility and inert properties making it ideal for sanitary pumping applications, although it alone may not have the durability to survive millions of cycles of pumping. As further discussed herein, backing 28 provides mechanical support to diaphragm 24 that the cover 30 cannot provide alone to increase the durability of the diaphragm 24 for many pump cycles.

Backing 28 is at least partially encapsulated within cover 30. For example, cover 30 can be overmolded onto backing 28. In some examples, the portion of backing 28 onto which the cover 30 is overmolded can itself be formed from a second polymer, such as non-reinforced polypropylene. The second polymer of backing 28 can be different from the first polymer forming cover 30. Overmolding the polymer cover 30 onto the polymer portion of the backing 28 forms a polymer bond therebetween providing an integrated structural interface formed therebetween. Overmolding the polymer cover 30 onto the polymer portion of the backing 28 can form a thermal bond therebetween providing an integrated structural interface formed therebetween. Such bonding is not formed between polymer and metal when the polymer is overmolded onto the metal. In some examples, no adhesive is located between the cover 30 and the polymer portion of backing 28. In some examples, no coating is located between the cover 30 and the polymer portion of backing 28.

In the example shown, cover 30 forms an entirety of the first, outer side 32 of diaphragm 24 and cover 30 forms part of the second, inner side 34 of diaphragm such that a remainder of the inner side 34 is formed by the backing 28 and the backing 28 is not exposed on the outer side 32.

Backing 28 includes hub 44 for connecting with a connecting rod 20 or other component of the drive 14 to mechanically force the center part of the diaphragm 24 through the linear reciprocation cycles while the bead 36 is held stationary so that the flexing portion 38 flexes. Portions of backing 28 can be exposed on inner side 34 of diaphragm 24, such as to facilitate connection with the drive 14. In the example shown, hub 44 includes a recess configured to connect diaphragm 24 to drive 14. For example, hub 44 can connect with the connecting rod 20 in any desired manner. For example, the recess of hub 44 can include interior threading configured to interface with a threaded portion of the connecting rod 20. While hub 44 is shown as including a recess, it is understood that hub 44 be of any desired configuration suitable for forming a connection with the driving component (e.g., connecting rod 20) of the pump 10. For example, hub 44 can include a projection, such as a threaded shaft, that extends axially outward relative to inner side 34.

Backing 28 includes flexible plate 40. Core 42 is a radially inner portion of backing 28. Core 42 is disposed towards a radial center of the diaphragm 24. Core 42 can be formed at least partially by flexible plate 40 of backing 28. In the example shown, backing 28 includes core 42 partially formed by flexible plate 40 and partially formed by mount 46. In the example shown, core 42 is partially formed by flexible plate 40 and partially formed by the material of mount 46, though it is understood that not all examples are so limited.

As best seen in FIG. 2C, an axial direction is indicated along the diaphragm axis DA, and a radial direction is indicated by vector R, it being understood that the radial direction extends 360-degrees orthogonal to the axis DA. As shown, the backing 28 is mostly embedded within the fluid contacting cover 30. The fluid contacting cover 30 may be formed from the first type of polymer, as previously described. The flexible plate 40 can be formed from the second type of polymer, which can be different from the first type of polymer. The cover 30 may be overmolded onto the flexible plate 40 such that a thermal bond is formed between the first and second types of polymers, merging the polymers at the boundary interface of the two parts. The first and second types of polymers can be thermally bonded in an overmolding step with no intermediary part between them, such as no coating or adhesive is interspaced between the cover 30 and the flexible plate 40. Cover 30 can be overmolded onto the flexible plate 40 to encase the flexible plate 40.

The second type of polymer that forms the flexible plate 40 can be a polypropylene, amongst other options. The second type of polymer forming the flexible plate 40 may not be reinforced. For example, the second type of polymer may not include any glass or fiber additives that would otherwise reinforce the polymer material. The second type of polymer forming the flexible plate 40 may be pure polymer, such as pure polypropylene, amongst other options.

As shown, the flexible plate 40 forms a part of core 42 of backing 28 and further includes outer ring 50 that projects radially outward away from the axis DA relative to the core 42. The outer ring 50 extends radially outward from the core 42. The outer ring 50 can extend fully circumferentially around the core 42. As shown, the outer ring 50 narrows axially as the outer ring 50 extends radially outward to an annular rim 52. Flexible plate 40 can be considered to include a convex head oriented in first axial direction AD1 and towards the outer side 32. In the example shown, the flexible plate 40 is dome-shaped with the top of the dome oriented towards outer side 32 of cover 30. In some examples, the flexible plate 40 can be considered to be mushroom shaped.

In the example shown, backing 28 includes a projecting step 54. Step 54 forms a portion of the core 42 of backing 28. Step 54 is a portion of core 42 formed by flexible plate 40. Outer ring 50 projects radially outwards relative to the step 54. The step 54 projects axially away from the portion of flexible plate 40 formed by outer ring 50. Step 54 extends in second axial direction AD2 along diaphragm axis DA and away from outer ring 50. In the example shown, step 54 is formed by the second polymer that forms the flexible plate 40. The projecting step 54 can axially overlap with the rest of the portion of the flexible plate 40 that forms the core 42. As such, the projecting step 54 can be part of the core 42, and the polymer of the flexible plate 40 that is radially outward from the projecting step 54 can form the outer ring 50. The portion of the flexible plate that axially overlaps with step 54 and mount 46 and which can radially overlap with outer ring 50 can form a portion of core 42. Components can be considered to radially overlap when those components are disposed at common axial locations along diaphragm axis DA. A radial line extending from diaphragm axis DA will extend through each of the radially overlapping components. Components can be considered to axially overlap when those components are disposed at common radial and circumferential locations such that an axial line parallel to diaphragm axis DA extends through the axially overlapping components.

In the example shown, cover 30 includes overlap flap 56 (e.g., formed as an annular flap) can extend over and axially overlap with the outer ring 50 of the flexible plate 40. Overlap flap 56 can also be referred to as an overlap ring in some examples. As shown, the overlap flap 56 radially overlaps with the projecting step 54. Overlap flap 56 can radially surround the step 54. In this particular embodiment, the overlap flap 56 is flush with the projecting step 54 on the axially inner side 34 of the diaphragm 24, but that may not be the case in all embodiments. With the overlap flap 56 covering a portion of the outer ring 50, outer ring 50 can be considered to be axially bracketed by the first polymer forming the cover 30. Outer ring 50 can be considered to be fully embedded within the cover 30 in the example shown. While outer ring 50 is fully embedded within the cover 30, the core 42 is partially embedded and partially exposed, in the example shown.

The hub 44 can be formed from a different type of material than the flexible plate 40. In the example shown, hub 44 is formed by mount 46 that is itself connected to flexible plate 40. As previously discussed, the flexible plate 40 is formed from a polymer. The mount 46 can be formed from metal, such as stainless steel, aluminum, or other materials. The flexible plate 40 can be attached to the mount 46 by being overmolded onto the mount 46.

In the example shown, mount 46 includes projections 48 that extend radially outward from an exterior side of the mount 46. The radial projections 48 of the mount 46 can create gaps, such as an axial gap 58, between which the polymer material of the flexible plate 40 can extend to increase the contacting surface area between flexible plate 40 and mount 46 and strengthen a mechanical connection between the flexible plate 40 and the mount 46. In some embodiments, the hub 44 is formed from the polymer of the flexible plate 40, such that no separate metal part (e.g., mount 46) to form the hub 44 is present (e.g., see FIG. 4). In some examples, flexible plate 40 can be overmolded onto mount 46 to connect flexible plate 40 and mount 46.

Due to the pumping forces, the outer ring 50 may move relative to the core 42 as the outer ring 50 is annularly cantilevered from the core 42. In this way, the flexible plate 40 is flexible due to the load under normal pumping conditions. The flexible movement of the flexible plate 40 supports a robust connection to the cover 30 due to the inherent movement of the fluid contacting cover 30 relative to the flexing portion 38 of the diaphragm 24. Flexing of the outer ring 50 allows the backing 28 to take up some of the necessary stiffening instead of the thermal bond between the flexible plate 40 and the fluid contacting cover 30 having to hold up against a constantly stretching cover 30. Flexible plate 40 provides resilience to diaphragm 24 where an alternative inflexible plate which would place a great deal of load on, and risk of separation of, the thermal bond. As such, flexibility in the flexible plate 40 reduces the risk of separation of the fluid contacting cover 30 from the flexible plate 40 for a longer lasting diaphragm 24. Such inflexible plate can also wear on cover 30 due to flexing of cover 30 on the radial edge of the inflexible plate. Flexible plate 40 flexing with cover 30 reduces wear and provides for greater resilience and longer lasting diaphragm 24.

Figure 4:
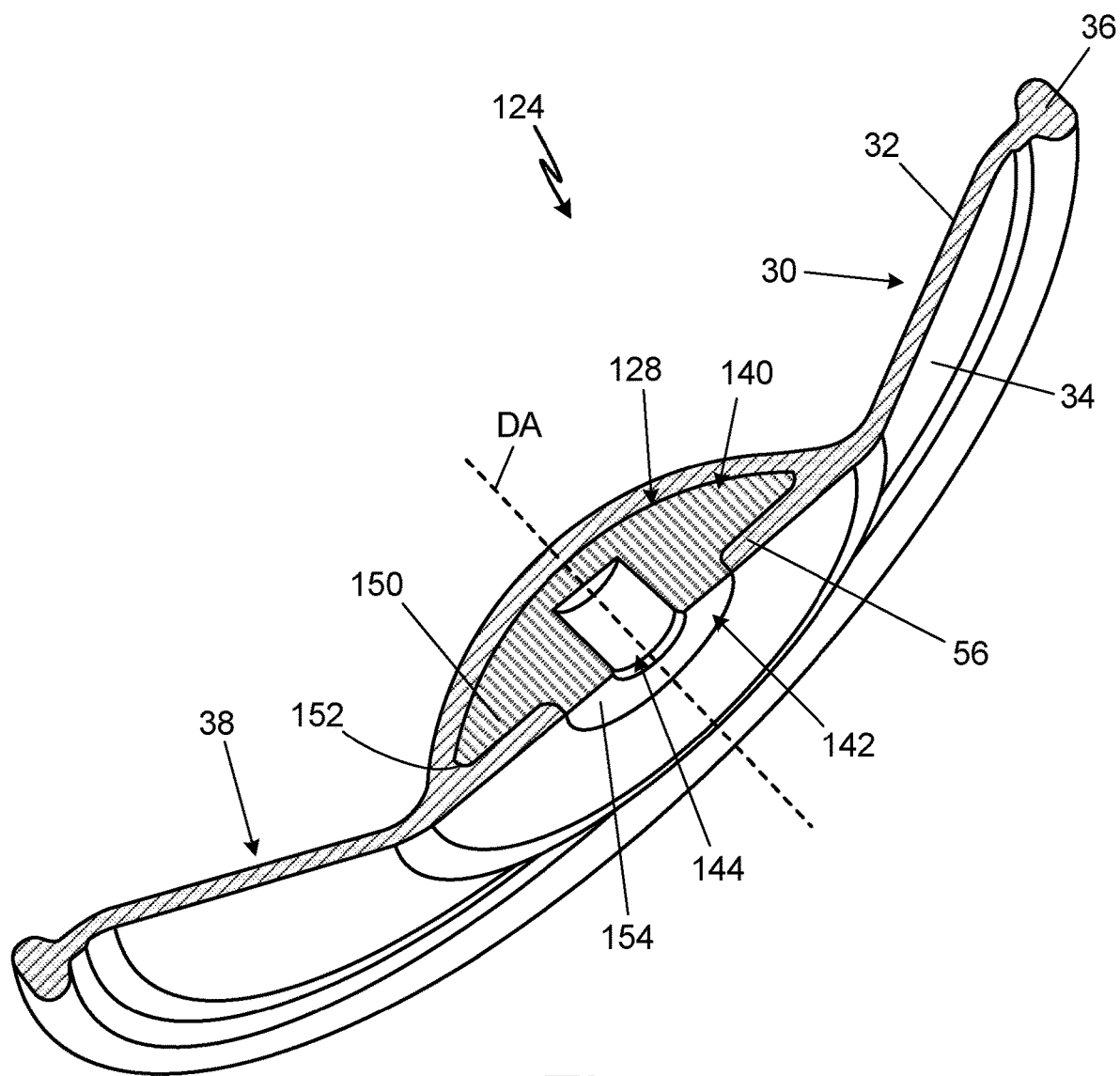
FIG. 4 is an isometric cross-sectional view of another diaphragm.

FIG. 4 is an isometric, cross-sectional view of diaphragm 124. Diaphragm 124 is substantially similar to diaphragm 24 (best seen in FIGS. 2A-3), except that diaphragm 124 includes a hub 144 formed from the flexible plate 140 rather than a separate component assembled to the flexible plate 140. Reference numbers of diaphragm 124 are increased by "100" relative to reference numbers of similar components of diaphragm 24. Backing 128 is at least partially embedded within cover 30. Outer ring 150 extends radially outward from core 142. Outer ring 150 projects to annular rim 152. Outer ring 150 is configured to flex relative to core 142 as diaphragm 124 reciprocates along diaphragm axis DA. Step 154 projects in second axial direction AD2 from outer ring 150. Hub 144 is formed as a recess within core 142. Core 142 is formed fully by flexible plate 140 in the example shown. The recess of hub 144 can be threaded to facilitate connecting with a drive of a pump. As shown, hub 144 can be formed by the polymer material of the flexible plate 140.

Figure 5:
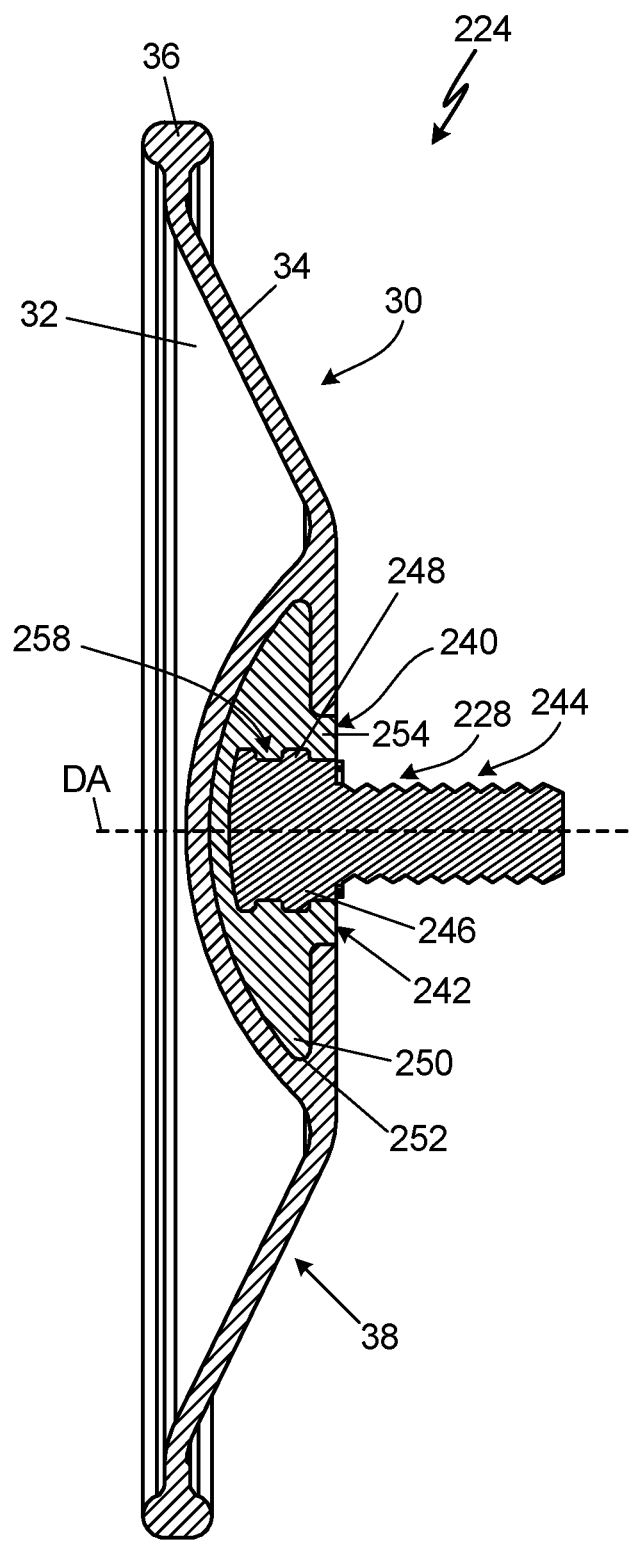
FIG. 5 is a cross-sectional view of yet another diaphragm.

FIG. 5 is an isometric, cross-sectional view of diaphragm 224. Diaphragm 224 is substantially similar to diaphragm 24 (best seen in FIGS. 2A-3) and diaphragm 124 (FIG. 4), except that diaphragm 224 includes a hub 244 formed as a projection extending outward from backing 228. Reference numbers of diaphragm 224 are increased by "200" relative to reference numbers of similar components of diaphragm 24.

Backing 228 is at least partially embedded within cover 30. Outer ring 250 extends radially outward from core 242. Outer ring 250 projects to annular rim 252. Outer ring 250 is configured to flex relative to core 242 as diaphragm 224 reciprocates along diaphragm axis DA. Step 254 projects in second axial direction AD2 from outer ring 250. Hub 244 is formed as a recess within core 242. Core 242 is formed partially by flexible plate 240 and partially by mount 246. Projections 248 extend radially from mount 246 and can define one or more axial gaps 158 for receiving the polymer material of flexible plate 240.

In the example shown, mount 246, similar to mount 46 (FIGS. 2A-3), is disposed within and attached to flexible plate 240. Hub 244 is formed from mount 246. Hub 244 is formed as a projection extending axially outward in second axial direction AD2 beyond inner side 34 of diaphragm 224. The projection forming hub 244 can be formed as a threaded shaft, though it is understood that hub 244 can be of any desired configuration for interfacing with a component, such as connecting rod 20 (FIG. 1), to connect to a drive of a pump.

Figure 6:
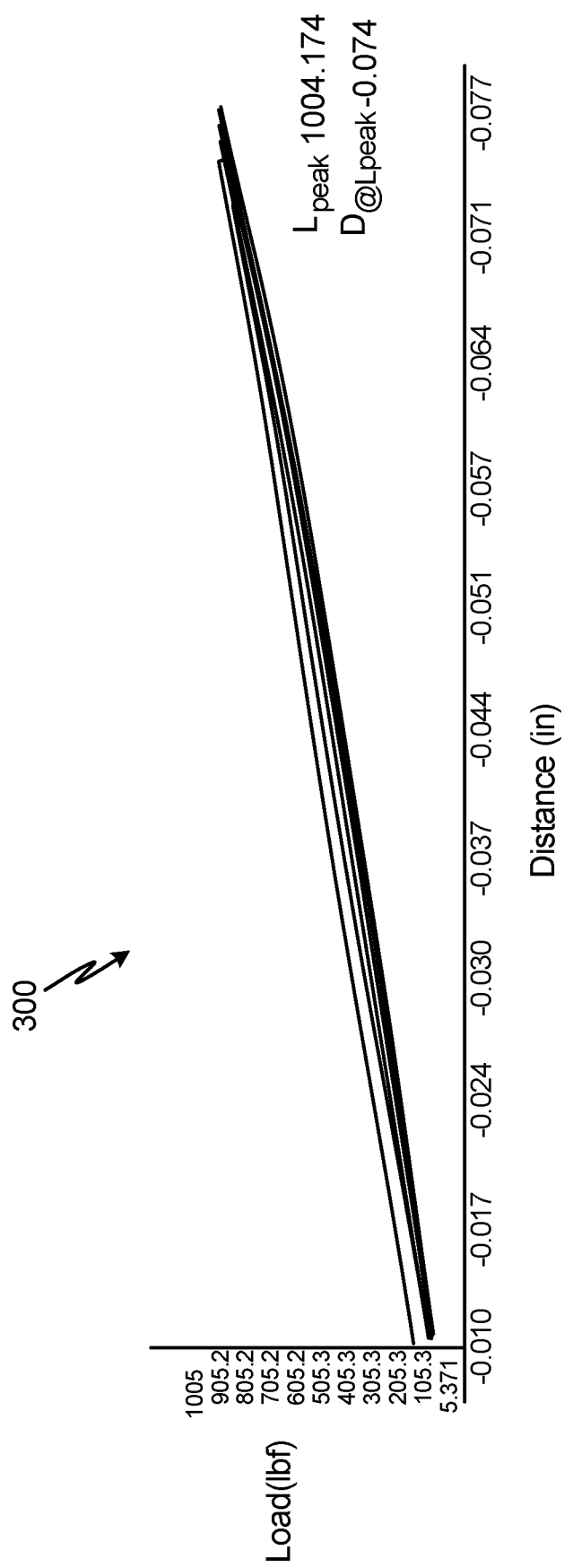
FIG. 6 is a stress-strain plot for a flexible backing of a diaphragm.

FIG. 6 is a plot 300 of stress-strain into the flexible plate 240 due to pump loads. Plot 300 was generated by holding the outer radial edge of outer ring 50 stationary and exerting loads on flexible plate 40 that are similar to normal pumping loads experienced during operation. The vertical Y-axis shows the load exerted on flexible plate 40 in pounds force foot (lbf) and the horizontal X-axis shows the displacement of the center of flexible plate 40 (e.g., aligned on the diaphragm axis DA) relative to the outer annular edge of outer ring 50 in inches (in.). As shown, linear elastic behavior is exhibited by the outer ring 50 of the flexible plate 40 under normal pumping loads.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A diaphragm for use in a pump and configured to reciprocate on an axis, the pump having a connecting rod, the diaphragm comprising:

a cover having a bead and a flexing portion radially inward from the bead, the cover formed from a first polymer and configured to contact fluid to pump the fluid; and a backing disposed at least partially within the cover, the backing comprising a hub for connecting to the connecting rod, the backing further comprising a flexible plate, the flexible plate formed from a second polymer, wherein the first polymer of the cover is thermally bonded to the second polymer of the flexible plate.

2. The diaphragm of claim 1, wherein the cover is overmolded onto the flexible plate to encase at least part of the flexible plate.

3. The diaphragm of claim 1, wherein the flexible plate is configured to flex under pump loads when the diaphragm is used in the pump.

4. The diaphragm of claim 1, wherein the second polymer of the flexible plate is not reinforced by fiber or glass.

5. The diaphragm of claim 1, wherein the backing comprises a core and an outer ring, the outer ring formed by the flexible plate, wherein the outer ring extends radially away from the core and fully circumferentially around the core.

6. The diaphragm of claim 5, wherein the outer ring is configured to move relative to the core when the diaphragm is used in the pump.

7. The diaphragm of claim 5, wherein the outer ring is formed from the second polymer and the core is at least partially formed from a material that is different from the second polymer.

8. The diaphragm of claim 7, wherein the material that is different from the second polymer is metal.

9. The diaphragm of claim 7, wherein the core includes a mount that is at least partially disposed within the flexible plate, the mount including a plurality of radial projections, and wherein a portion of the second polymer is located directly axially between radial projections of the plurality of radial projections.

10. The diaphragm of claim 5, wherein the outer ring and the core are formed from the second polymer.

11. The diaphragm of claim 5, wherein the hub includes a recess within the core.

12. The diaphragm of claim 11, wherein the recess is threaded to connect with the connecting rod of the pump.

13. The diaphragm of claim 1, wherein no adhesive agent is located between the flexible plate and the cover.

14. The diaphragm of claim 1, wherein no coating is located between the flexible plate and the cover.

15. The diaphragm of claim 1, wherein the flexible plate is located radially inward of the flexing portion of the cover.

16. The diaphragm of claim 1, wherein the flexible plate includes a step that projects axially relative to an outer ring of the flexible plate.

17. The diaphragm of claim 16, wherein the cover includes an overlap flap that radially surrounds the step and axially overlaps with the flexible plate.

18. The diaphragm of claim 1, wherein the diaphragm comprises a first side and a second side, the cover forming an entirety of the first side and part of the second side such that a remainder of the second side is formed by the backing and the backing is not exposed on the first side, and the first side intended to contact the fluid being pumped by the pump.

19. The diaphragm of claim 1, wherein the flexible plate includes a convex head.

20. The diaphragm of claim 1, wherein the flexible plate is dome-shaped.

* * * * *